(12) United States Patent
Rimaldi et al.

(10) Patent No.: US 12,710,941 B2
(45) Date of Patent: Aug. 18, 2026

(54) QUANTITATIVE RANKING FOR SOFTWARE DEPENDENCY COMPATIBILITY

(71) Applicant: International Business Machines Corporation, Armonk, NY (US)

(72) Inventors: Tyler Vezio Rimaldi, Mahopac, NY (US); Michael E Gildein, Wappingers Falls, NY (US); Andrew C. M. Hicks, Highland, NY (US); Ryan Thomas Rawlins, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 18/534,796

(22) Filed: Dec. 11, 2023

(65) Prior Publication Data

US 2025/0190191 A1 Jun. 12, 2025

(51) Int. Cl.
*G06F 8/41* (2018.01)

(52) U.S. Cl.
CPC .................................... *G06F 8/433* (2013.01)

(58) Field of Classification Search
CPC ....................................................... G06F 8/433
See application file for complete search history.

(56) References Cited

U.S. PATENT DOCUMENTS 7,140,013 B2 * 11/2006 Te'eni ................. G06F 9/44552 717/173
8,443,080 B2 * 5/2013 Ding ......................... G06F 9/54 709/224
9,235,402 B2 1/2016 Carpenter
9,483,284 B2 11/2016 Pandit
9,830,133 B1 * 11/2017 Baskaran ................ G06F 8/453
10,325,003 B2 6/2019 Dighe
10,782,962 B2 * 9/2020 Moondhra ............ G06F 16/903
11,044,139 B1 * 6/2021 Farber ................. G06F 16/9024
11,204,848 B1 * 12/2021 Hicks .................. G06F 11/3692
11,372,629 B1 * 6/2022 Meister ..................... G06N 3/08
11,409,507 B1 * 8/2022 Shepherd ............. G06Q 10/103
11,586,436 B1 2/2023 Jennings
11,789,769 B2 * 10/2023 Baskaran .................. G06F 8/45 718/106
12,353,856 B2 * 7/2025 Dahl ......................... G06F 8/36

(Continued)

FOREIGN PATENT DOCUMENTS

CN 107066256 A * 8/2017 ........... G06F 16/288
CN 106575246 B * 1/2021 ............. G06N 20/00
CN 114879978 A 8/2022

OTHER PUBLICATIONS

Schlegel, Viktor, et al. "Vajra: step-by-step programming with natural language." Proceedings of the 24th International Conference on Intelligent User Interfaces. 2019.*

(Continued)

*Primary Examiner* — Francisco J Aponte
(74) *Attorney, Agent, or Firm* — Anthony Curro

(57) ABSTRACT

A computer system, computer readable storage medium, and computer-implemented method for ranking and ordering software interrelationships. The method includes generating a ranking of software dependency combinations. The ranking is at least partially subject to one or more criteria. The method also includes ordering the ranked software dependency combinations.

21 Claims, 6 Drawing Sheets

(56) References Cited

U.S. PATENT DOCUMENTS 12,554,476 B2 * 2/2026 Yue .......................... G06F 8/63
2015/0301849 A1 * 10/2015 Du .......................... G06F 8/65
718/1
2015/0363195 A1 12/2015 Schlueter
2016/0196122 A1 * 7/2016 Baskaran ................ G06F 8/453
717/151
2017/0015330 A1 * 1/2017 Armbruster ....... B60W 50/0098
2018/0088937 A1 * 3/2018 Tamir ...................... G06F 8/433
2020/0326935 A1 10/2020 Hicks
2021/0021614 A1 1/2021 Shahbaz
2022/0188083 A1 6/2022 Hicks
2023/0098939 A1 * 3/2023 Eloul ..................... G06N 20/10
717/120
2023/0333967 A1 * 10/2023 White ................... G06F 11/079
2023/0342145 A1 * 10/2023 Kandel ..................... G06F 8/77
2024/0184659 A1 * 6/2024 Vandeventer ............. G06F 8/71
2024/0419423 A1 * 12/2024 Chen ......................... G06F 8/63
2025/0348372 A1 * 11/2025 Swift .................. G06F 11/3604

OTHER PUBLICATIONS

Parri, Jacopo. "Verification of Enterprise Software Architectures with stateful managed components." (2021).*

Anonymous "Package Dependency Solving and Guidance System," IP.com No. IPCOM000195285D, Apr. 27, 2010, 5 pages.

Raji, Mohammad, "Refactoring Software Packages Via Community Detection from Stability Point of View," arXiv preprint arXiv:1811.10171, 2018, 83 pages.

* cited by examiner

QUANTITATIVE RANKING FOR SOFTWARE DEPENDENCY COMPATIBILITY

BACKGROUND

The present disclosure relates to computer software, and, more specifically, ranking and ordering software interrelationships.

Software configurations often include levels of complexity in the way they interoperate. As time goes on these complexities have increased.

SUMMARY

A system, medium, and method are provided for ranking and ordering software interrelationships.

In one aspect, a computer system for ranking and ordering software interrelationships is presented. The system includes one or more processing devices, one or more memory devices communicatively and operably coupled to the one or more processing devices, and a software interrelationships tool at least partially resident within the one or more memory devices. The software interrelationships tool is configured to generate a ranking of software dependency combinations. The ranking is at least partially subject to one or more criteria. The software interrelationships tool is also configured to order the ranked software dependency combinations.

In another aspect, a computer readable storage medium is presented. The computer readable storage medium includes computer executable instructions that when executed by at least one computing device, order and rank software interrelationships. The computer readable storage medium includes instructions to generate a ranking of software dependency combinations. The ranking is at least partially subject to one or more criteria. The computer readable storage medium also includes instructions to order the ranked software dependency combinations.

In yet another aspect, a computer-implemented method for ranking and ordering software interrelationships is presented. The method includes generating a ranking of software dependency combinations. The ranking is at least partially subject to one or more criteria. The method also includes ordering the ranked software dependency combinations.

The present Summary is not intended to illustrate each aspect of every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
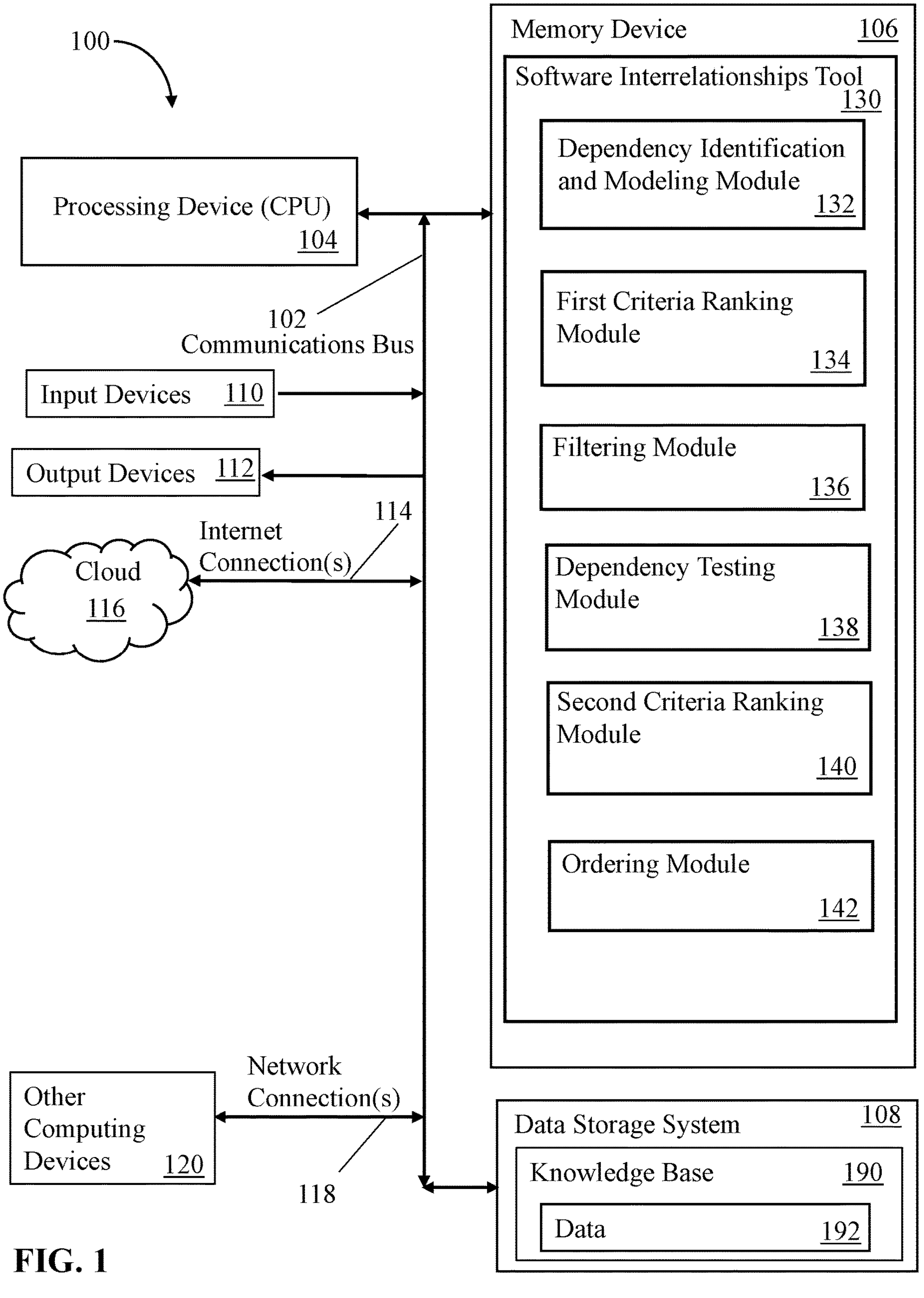
FIG. 1 is a block diagram illustrating a computer system configured to execute operations directed toward ranking and ordering software interrelationships, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to implementing a system and method ranking and ordering software interrelationships. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following detailed description of the embodiments of the apparatus, system, method, and computer readable storage medium of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

For purposes of this disclosure, "facilitating" an action includes performing the action, making the action easier, helping to carry the action out, or causing the action to be performed. Thus, by way of example and not limitation, instructions executing on one processor might facilitate an action carried out by semiconductor processing equipment, by sending appropriate data or commands to cause or aid the action to be performed. Where an actor facilitates an action by other than performing the action, the action is nevertheless performed by some entity or combination of entities.

Software configurations often include levels of complexity in the way they interoperate. As time goes on these complexities have increased. At least some software configurations are arranged as software suites and software architectures. The software configurations include software applications with varying purposes, where such software applications are sometimes referred to as software programs. In some instances, at least a portion of the software applications are independent from each other; however, they may include dependencies with the respective operating systems. In contrast, a plurality of software applications, such as those for word processing, spreadsheets, presentation, and email are integrated (or bundled) with each other, as well another software applications into software packages. Such software packages include inherent dependencies between the software applications in addition to the operating systems. In some instances, the software package will include a primary application and multiple smaller, complementary programs bundled together to enhance the primary application.

For purposes of this disclosure, the term "dependencies" extends through a number of domains. For example, one domain includes families of software application packages that are each a version of a particular software application that have an inherent relationship, i.e., a dependency with one or more prior versions of the particular software application with respect to one or more characteristics, features, and software modules thereof. A second domain includes one or more software components of a singular, or multiple software applications that are communicatively and/or operably coupled together (i.e., bundled) in a specific manner to allow them to function properly, such as installation operations and execution operations, for the respective software application. In some instances, the dependent interrelationships between various software applications may be associated with additional features in a particular software application that may, or may not, be enabled as a function of the client's requirements. For such additional features, varying configurations need to be evaluated with the features enabled and not enabled, thereby further increasing the efforts required to correctly integrate the affected software applications. Such software dependencies may be associated with any consumable software component. In general, such components are often referred to as software modules, software services, and software libraries.

In other dependency domains, some characteristics and features of the various software applications may also be environmental such as, and without limitation, operating system dependencies. Such dependencies also extend to particular drivers and services which share one or more resources, libraries, features, hardware structures, etc. that are associated with a corresponding one or more of the software application instances. In many instances, a software interrelationship compatibility level is associated with each identified software application dependency.

The increased complexity of the individual software applications as stand-alone artifacts increases the complexity of the respective computing environments when there are dependencies between such software applications and operating systems. For purposes of this disclosure, the term "computing environments" refers to a 360-degree perspective that includes the hardware and client requirements, as well as the software assets. In addition, as a result of bundling, the software packages include inherent increases in complexity and dependencies. Moreover, the dependencies between the previous versions of a particular software application and software package typically increase over time, especially when the number of previous versions are numerous. Some known software configurations include software applications and software packages that receive frequent revisions, thereby adding to the number of previous versions. Also, in some cases, such revisions to software applications and software packages remove or alter previous dependencies. In many cases, no two software configurations will be identical, such that the respective dependencies in the respective environments will be different between the software configurations.

For purposes of this disclosure, the term "software packages" is used to define the bundled software applications as previously described. Accordingly, while the present application discusses software packages, the features of the present disclosure directed toward ranking and ordering software interrelationships are applicable to individual software applications with respective dependencies as well as software packages, unless otherwise stated.

Direct dependencies are those dependent interrelationships that are explicitly (i.e., directly) defined by one or more portions or components of the affected software packages. For example, a particular functional file in a software package requires access to a library, meaning that the file has a direct dependency on that library and the library will be imported to accomplish the desired objective. In contrast, transitive dependencies are those dependencies beyond the direct dependencies. In general, transitive dependencies are those dependent interrelationships that are indirectly defined by one or more portions or components of the affected software packages. For example, revisiting the library example for the direct dependencies, if the subject library uses a second library, the subject functional file in the subject software package has a transitive dependency on the second library.

In this world of ever-increasing complexity of technical projects associated with known software configurations, where new software interrelationship dependencies and computing environments are consistently introduced, it becomes very costly to determine which software versions and software combinations with the inherent dependencies are acceptable to use together, with a focus on minimizing or eliminating any potential incompatibilities. For example, in some software configurations, an otherwise seemingly innocent upgrading of a software package, or a wholesale replacement thereof, can render significant portions of the entire software configuration either unreliable, or completely unusable.

In some software configurations, the respective dependencies are often densely intertwined, and un-wrangling any dependency issues, known and/or unknown, exacts a significant cost in time and the associated human capital. In some instances, potential exploits and vulnerabilities exist in the dependencies, but may be unavoidable, where remediation solutions are not yet made available. Also, in some instances, for particular software packages in particular software configurations, version incompatibility may be present with dependencies at all levels of the respective environment, e.g., operating system dependencies, software interrelationship dependencies, hardware requirements, client-based restrictions, etc. In addition, common activities, such as porting software to other environments and configurations, requires manually analyzing layers of composition within each software packages to identify all of the dependencies and take remedial actions prior to inadvertently creating dependency-related issues that may inadvertently (and adversely) impact the respective client's enterprise. For example, a typical software inventory for installation includes a set of software packages that need to be installed in a certain order, possibly with specific time constraints, might have undiagnosed vulnerabilities, and some packages that might have been updated recently may no longer work with the other packages, even though the previous versions integrated seamlessly.

The issues and problems are exacerbated when multiple versions of a particular software package are necessary to support different client computing environments and their respective business (or personal) requirements. Manually addressing each new software package individually to minimize risks associated with numerous potential compatibilities, becomes extremely difficult and tedious, if not impossible, to successfully accomplish. Such efforts are especially important and difficult as more and different software interrelationship dependencies through a myriad of versions of the numerous software packages across a wide range of varying configurations are introduced. In addition to finding incompatibilities with respect to software interrelationship dependencies, it is also necessary to identify the most compatible dependencies with respect to a particular environment based on one or more specified criteria. Such specified criteria may include one or more of software combinations that may be more important or most commonly found in an average client environment. Moreover, other examples of specified criteria include, without limitation, the software versions with the fewest number of defects, the fewest number of vulnerabilities, or the versions with the largest user base. In some cases, in addition to software-related issues, the specified criteria is directed toward hardware, overall environments, and/or software configurations.

In some software configurations, error notifications are presented to the user upon installing incompatible packages. Some software configurations provide the user with a dependency tree mapping of what the various packages in question might be dependent upon. However, no known software configurations provide an actual ranking (or suggestion) of applicable dependencies and their associated versions. These packages (or dependencies) are not installed for a given set of user-defined criteria. Therefore, in the current landscape, there is no method of generating an optimally ranked and ordered set of combability and dependency interrelationships based on one or more specified criteria for software packages, related hardware, computing environments, and/or software configurations. For purposes of this disclosure, the term "ranked" is directed toward the relative dependency compatibilities of various software packages with each other, including the respective versions thereof. Also, for purposes of this disclosure, the term "ordered" is directed toward the temporal order of installation of the software packages that have been selected subject to the rankings.

Accordingly, a system, medium, and method are provided for ranking and ordering software interrelationships. Specifically, in at least some embodiments, a list of software packages is created that operates seamlessly with each other for the respective software configuration and computing environment based on one or more provided criteria is enabled through the system, medium, and method as presented herein.

More specifically, implementation of the software interrelationship enhancements presented herein includes a first ranking of a Cartesian product of software dependency combinations. The first ranking is at least partially achieved through employing predetermined criteria directed toward, for example, and without limitation, one or more of the affected software packages, the affected hardware apparatus, the overall computing environments, and the affected software configurations. Such predetermined criteria includes user-defined criteria.

In general, a Cartesian product of two sets (X and Y) is denoted as X×Y, is set of all ordered pairs (x,y), where x is an element of the set X and y is an element of the set Y. The Cartesian product is further defined as the set of all possible ordered combinations consisting of one member from each set X and Y. If there are two non-zero elements in each of sets X $(x_1,x_2)$ and Y $(y_1,y_2)$, the Cartesian product of the two sets X and Y (X×Y), will be the four ordered pairs of $\{(x_1,y_1), (x_1,y_2), (x_2,y_1), (x_2,y_2)\}$. The four ordered pairs define a 2×2 product table (sometimes referred to as a matrix) with four cells such as:

TABLE 1

| X/Y | $y_1$ | $y_2$ |
|---|---|---|
| $x_1$ | $(x_1, y_1)$ | $(x_1, y_2)$ |
| $x_2$ | $(x_2, y_1)$ | $(x_2, y_2)$ |

where the elements of X are on the left and the elements of Y are on the top. Similarly, the Cartesian product of the two sets Y and X (Y×X), will be the four ordered pairs of $\{(y_1,x_1), (y_1,x_2), (y_2,x_1), (y_2,x_2)\}$, where the elements of X are now on the top and the elements of Y are now on the left. The ordered pairs between the two Cartesian products are not associative, i.e., $(x_1,y_1)\neq(y_1,x_1)$ (unless X=Y), etc. Extrapolating the concepts of Cartesian products to the present application directed toward versions of software applications, for three separate software applications including a first software application in the domain X that has 12 different versions, a second software application in the domain Y that has 6 different versions, and a third software application in the domain Z that has 3 different versions, the Cartesian product of X×Y×Z would be 12×6×3=216 ordered triplets in a table that includes 216 cells in a three-dimensional matrix. The subsequent addition of sets is handled in a similar manner.

In at least some embodiments, the Cartesian product of software dependency combinations defines a problem space subject to the user-defined criteria, where the problem space includes all of the possible usable dependencies for the given criteria. In some embodiments, one source of at least partial dependency information for a large number of software packages includes various package management systems such as, and without limitation, pip (the package management system authored in PYTHON®), APT package manager, and npm package manager. Such package management systems provide version levels and package information that are used as input into the processes described herein such that an optimal set of compatibility dependencies is based on the additional input data described further herein. In some embodiments, the dependency information for software packages is obtained from any sources that enable operation of the embodiments presented herein.

In some embodiments, the problem space is referred to as the test space, since at least a portion of the dependency compatibilities, or incompatibilities, will be tested and verified. As such, the problem space transparently models the full inventory of affected software packages, the respective versions thereof, and the respective dependencies. In some embodiments, certain software dependency combinations are weighed to a greater degree than other software dependency combinations. In some embodiments, combinational test design (CTD) modelling is employed to examine the features and dependencies under consideration through defining one or more abstract models of the respective domains' problem space. Accordingly, the Cartesian product of software dependency combinations defines one or more models of the dependencies in the problem space.

In one or more embodiments, the problem space includes such a large number of software dependency combinations that any subsequent operations will be computationally expensive. Therefore, in some embodiments, metadata associated with the software packages is collected and analyzed. At least a portion of the relevant metadata for the software packages includes, without limitation, that metadata associated with support and service by the respective vendors that is at least partially indicative of dependency issues that have been previously identified. In addition, such metadata includes historical and/or empirical compatibility metadata to enhance knowledge associated with known incompatibilities and existing deployments.

Such metadata is collected from sources that include, without limitation, information published by the software vendors, community information for the subject software packages, known dependencies through experience, and software repositories, e.g., GITHUB® (registered to GitHub, Inc.). The respective collected metadata facilitates determining certain software package dependencies and compatibilities, such as which versions are acceptable to use with the computing environment and software configurations, can be obtained and factored into the analyzing, weighting, and testing of software dependency compatibility. In addition, the collected metadata will at least partially determine the stability of the respective software package within a given computing environment. Moreover, the collected metadata will at least partially determine how compatible the respective software package is with other software packages that coexist with it in the respective software configuration. In order to make these dependency compatibility determinations, the collected metadata is used to generate sets of dependency logic. For purposes of this disclosure, the term "dependency logic" refers to one or more orderings of dependencies that could be defined as a set of trees of dependent packages or other software entities. Benefits of using the metadata include facilitating more efficient and optimal compatibility sets being discovered and validated, and improving throughput on projects that require efforts such as porting software packages to new environments.

In addition to using collected metadata, at least some of the embodiments described herein apply weighting factors to specific software entities in the models to highlight combinations of dependencies based on specified criteria. The software entities include, without limitation, present and prior versions of the software packages that are subject to the present analyses. For example, and without limitation, the weighting process includes highlighting those dependency combinations that may be more important or most commonly found in client environments.

In some embodiments, subject to the collected metadata and respective weightings, "average" computing environments and software configurations are modeled therefrom. Moreover, in some embodiments, by applying the determined weights, the software packages and their versions are ranked through application of the ranking criteria including one or more of, without limitation, the versions with the fewest number of defects, the fewest number of vulnerabilities, and/or the versions with the largest user base. Moreover, the ranking of the software packages and their respective dependencies and subsequent ranking of the combinations of dependencies facilitate the verification of compatibility. For example, for a present version of a software package that is version 3.5, few, if any, dependency compatibility issues are found and the applied weighting is relatively low (indicative of strong dependency compatibility) and the relative ranking will be more favorable. Similarly, for version 1.1 of the same software package, many dependency compatibilities are found and the applied weighting is relatively high (indicative of low dependency compatibility) and the relative ranking will be less favorable. Accordingly, the software package compatibilities are ranked subject to the user-defined criteria.

Accordingly, in at least some embodiments, the generated Cartesian product further generates an inventory of software package dependencies, where such inventory of software packages and their respective dependencies are ranked subject to the collected metadata and the user-defined criteria. As such, the population of relevant dependencies in the Cartesian product has been at least partially decreased from that of the initial full inventory of dependencies to facilitate computing efficiency. The remaining combinations of dependencies associated with software package dependence compatibility as represented through the remaining dependencies under consideration are testable.

In one or more embodiments, the sets of ranked software package dependencies are further filtered based on additional criteria. Such additional criteria includes, without limitation, employment of the common vulnerability scoring system (CVSS) that is a free and open industry standard for assessing the severity of computer system security vulnerabilities. As such, CVSS assigns severity scores to vulnerabilities, thereby allowing users to prioritize responses and resources according to the detected threat. Scores range from 0 to 10, with a score of 0 indicating that the vulnerability is less significant than the highest vulnerability with a score of 10 (most severe). Therefore, in some embodiments, any software package with a CVSS less than 8 cannot be used, since it may not address the most severe vulnerabilities. In some embodiments, the additional criteria are based on user-defined requirements for performance. For example, a user may determine that any version of a software package older than five years, or with a version number less than a stated version will be prohibited from installing on the respective software configurations.

In addition, in some embodiments, rather than exclusively CVSS scores, at least a portion of the previously described metadata includes detailed security vulnerability scores for the respective dependencies. Such security-oriented metadata is provided by one or more of other institutions that generated or analyzed such metadata and collected proprietary standards. Moreover, in some embodiments, another source of security-oriented metadata includes analyses such as, without limitation, backwards compatibility, Application Programming Interface (API) compatibility, general stability, best practices, complexity scores, technical debt, and maintainability.

In some embodiments, after creating the ranked set of testable dependency combinations, the embodiments described herein will reduce each of the software dependency combinations in the set to software dependency sub-combinations, i.e., sets of dependencies that can now be tested and verified for compatibility. Such reducing is at least partially subject to one or more of the user-defined criteria. The dependency sets define the dependency logic. As the software dependency sub-combinations pass or fail their respective tests, the population of ranked sets of dependencies will be decreased within the model's overall test space by flagging the results of a given software dependency set, or sub-combination, and removing it from the model. For example, by taking the Cartesian product of a given set of dependencies remaining in the initial problem space, if a set of dependencies from the initial problem space fail a certain condition based on the provided criterion (e.g., failure deemed by incompatibility), then all sets containing combinations of that dependency set can automatically be removed from the problem space, thereby reducing the initial problem space to a much smaller population of dependency sets.

In some embodiments, such reduction of the dependency sets is includes creating problem subspaces, where at least a portion of the problem subspaces are limited to the respective sets of dependencies. As such, the problem space is reduced to one or more subspaces based on the additional user-defined criteria. As a result, the overall set of possible options to be evaluated is at least partially based on the set of options applicable to the target environment. Within this reduction, the testable ordered sets are generated, these sets are then tested, and those successful combinations are then stored into a further reduced subspace. Accordingly, a second round of reductions of the combinations to be further evaluated results in a problem subspace that has far fewer combinations than the original problem space.

In at least some embodiments, the dependency logic in the form of testable software dependency sub-combinations, i.e., the sets, or sets, of dependencies that were generated as previously described and are remaining resident within the respective subspaces. In some embodiments, such ranking includes further testing subject to additional criteria such as, and without limitation, vulnerability counts as determined through the CVSS, and version release modification date. Once the sets of dependencies are tested subject to the ranking, if the set fails, the set is labeled as incompatible dependencies, thereby designating the respective software packages as incompatible, and the respective subspace population of sets of dependencies is further decreased. If the set passes the testing, the respective dependencies are compatible. In some embodiments, once the testing of each set of dependencies is completed, the final ranking of the sets of dependencies is used to create a respective eigenvector set of compatibility amongst dependencies.

In general, an eigenvector is a nonzero vector that changes at most by a constant factor referred to as the corresponding eigenvalue. The eigenvectors extend in a fixed direction for a given linear map (sometimes referred to as linear transformation), where the linear map is the aforementioned matrix of 216 cells. If each of the sets X, Y, and Z represents a particular software application, each version of the respective software application is represented by a unique element, e.g., $x_1, x_2, \ldots x_{12}, y_1, y_2, \ldots y_6$, and $z_1 \ldots z_3$. In addition, particular attributes of each version of the software applications are represented as fields that expand the matrix to more than three dimensions with the appropriate number of cells. The attributes for the respective fields are represented as numerical values. The eigenvectors of interest in the present disclosure are multi-dimensional vectors that represent the particular attribute (or field) of interest for a particular version of a particular software application that will be accessed for the processes described further herein. The previously discussed criteria are directly associated with the respective attributes.

For example, a first attribute is the number of known defects in each version of the respective software packages. The respective ranking criterion for this attribute is the software versions with the fewest number of defects. A second attribute is the number of known vulnerabilities in each version of the respective software packages. The respective ranking criterion for this attribute is the software versions with the fewest number of vulnerabilities. A third attribute is the size of user base for each version of the respective software packages. The respective ranking criterion for this attribute is the software versions with the largest user base. In some cases, in addition to software-related issues, the specified attributes and criteria are directed toward one or more of hardware, overall environments, and software configurations. These attributes are represented as numerical values. The arrow for the respective eigenvector for any one or more of the attributes and criteria under consideration extends from the origin of the matrix to the value that results from the square root of the sum of the squares for the attributes, i.e., the eigenvector collapses to an eigenvalue.

Each respective eigenvector set of compatibility amongst dependencies is collapsed into an eigenvalue that ultimately depicts quantitatively what the user wants for the software configuration as a variance metric based on the provided criteria. The use of eigenvectors and eigenvalues is sufficiently efficient to rank and order the respective compatibility dependencies as the respective variance metrics without requiring an extensive amount of computing resources. Each set of the ranked compatibility dependencies and respective software package sets is depicted as a dependency tree, where each dependency tree indicates the order of software installation to abide by the parameters set by the nature of the dependencies.

In some embodiments, the different dependency trees for each version of compatible software are compared, and if more than one version is compatible and could be installed, each version of the subject software will have an eigenvalue for all of the dependencies for that version. Once the eigenvalues for each of the compatible versions are generated, the user-defined criteria is used to determine which of the versions will be installed first, and if acceptable to the user, will be utilized as a portion of the software configuration. Accordingly, the ranked compatible software packages are ordered for the optimal sequence for installation.

Referring to FIG. 1, a block diagram is presented illustrating a computer system, i.e., a software interrelationships system 100 (herein referred to as "the system 100") configured to execute operations directed toward ranking and ordering software interrelationships at least partially as a function of software dependency compatibility, in accordance with some embodiments of the present disclosure. The system 100 includes one or more processing devices 104 (only one shown) communicatively and operably coupled to one or more memory devices 106 (only one shown) through a communications bus 102, and in some embodiments, through a memory bus (not shown). In some embodiments, the processing device 104 is a multicore processing device. The system 100 also includes a data storage system 108 that is communicatively coupled to the processing device 104 and memory device 106 through the communications bus 102. In at least some embodiments, the data storage system 108 provides storage to, and without limitation, a knowledge base 190 that includes at least a portion of the data 192 to enable operation of the system 100 as described further herein.

The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1). In at least some embodiments, the system 100 is a portion of a cloud computing environment (see FIG. 4), e.g., and without limitation, the system 100 is a computer system/server that may be used as a portion of a cloud-based systems and communications environment through the cloud 116 and the Internet connections 114.

In one or more embodiments, a software interrelationships tool 130 (herein referred to as "the tool 130") is at least partially resident within the memory device 106. In some embodiments, the tool 130 is fully resident within the memory device 106. The tool 130 is configured to execute, with full or partial automation, tasks that include, without limitation, ranking and ordering software interrelationships. Specifically, in at least some embodiments, a list of software packages is created that operates seamlessly with each other for the respective software configuration and computing environment based on one or more provided criteria. In at least some embodiments, the tool 130 resident in the memory device 106 is configured to run continuously in the background to automatically execute the processes as disclosed herein. In some embodiments, the tool 130 is directly engaged for specific tasking by the users thereof, e.g., and without limitation, manual execution commands. In some embodiments, the individual components of the tool 130 (as discussed further herein) are resident within a plurality of computing devices across the system 100 through, for example, and without limitation, the network connections 118 and the Internet connections 114.

In one or more embodiments, the tool 130 includes a dependency identification and modeling module 132 that, in some embodiments, generates a problem space (see FIG. 3 herein) subject to user-defined criteria such that the problem space includes all of the possible usable dependencies for the given criteria embedded within a Cartesian product of software dependency combinations. The dependency data is imported from a variety of sources as described further herein.

In some embodiments, the problem space is referred to as the test space, since at least a portion of the dependency compatibilities, or incompatibilities, will be tested and verified there. As such, the problem space, through the dependency identification and modeling module 132, transparently models the full inventory of affected software packages, the respective versions thereof, and the respective dependencies. In some embodiments, certain software dependency combinations are weighed to a greater degree that other software dependency combinations. Accordingly, the dependency identification and modeling module 132 generates the Cartesian product of software dependency combinations that defines one or more models of the dependencies in the problem space.

In addition, in some embodiments, in the event that the problem space includes such a large number of software dependency combinations that any subsequent operations will be computationally expensive, the dependency identification and modeling module 132 facilitates collecting metadata associated with the software packages from a variety of sources as described further herein. Moreover, the dependency identification and modeling module 132 facilitates analyzing the relevant metadata for the software packages, including generating dependency compatibility determinations and generating sets of dependency logic.

In addition to using collected metadata, in at least some of the embodiments described herein, the dependency identification and modeling module 132 applies weighting factors, i.e., weights to specific software entities in the models to highlight combinations of dependencies based on the specified criteria.

In one or more embodiments, the tool 130 includes a first criteria ranking module 134 to execute a first ranking of the software package dependencies within the Cartesian product of software dependency combinations. The first ranking is discussed further herein. Accordingly, in at least some embodiments, the first criteria ranking module 134 facilitates decreasing the population of dependencies in the Cartesian product at least partially from that of the initial full inventory of dependencies to facilitate computing efficiency.

In at least some embodiments, the tool 130 includes a filtering module 136 that further filters the sets of ranked software package dependencies based on additional criteria as discussed further herein.

In some embodiments, the tool 130 includes a dependency testing module 138 that reduces the ranked set of testable dependency combinations to software dependency sub-combinations, i.e., sets of dependencies that can now be tested and verified. Such reducing is at least partially subject to one or more of the user-defined criteria. The dependency sets define the dependency logic. The dependency testing module 138 will further decrease the population of ranked and filtered sets of dependencies as the software dependency sub-combinations pass or fail their respective tests as discussed further herein, thereby decreasing the software dependency sub-combinations in the problem space to a much smaller population of dependency sets. In some embodiments, such reduction of each of the dependency sets is referred to as creating problem subspaces, where at least a portion of the problem subspaces are limited to the respective sets of dependencies. Accordingly, the dependency testing module 138 executes a second round of decreasing the combinations to be further evaluated resulting in a problem subspace that has fewer combinations than the original problem space.

In one or more embodiments, the tool 130 includes a second criteria ranking module 140 that executes a second ranking of the remaining software dependency sub-combinations, i.e., the sets of dependencies that were generated as previously described and are remaining resident within the respective subspaces. In some embodiments, such ranking includes further testing subject to additional criteria such as, and without limitation, vulnerability counts as determined through the CVSS, and version release modification date. Each set of dependencies is translated into a respective eigenvector. Once the sets of dependencies are tested subject to the ranking, if the set fails, the set is labeled as incompatible dependencies, thereby designating the respective software packages as incompatible, and the respective subspace population of sets of dependencies is further decreased. If the set passes the testing, the respective dependencies are compatible. Once the testing of each set of dependencies is completed, the final ranking of the sets of dependencies is used to create a respective set of compatibility amongst dependencies that will ultimately be collapsed into an eigenvalue that depicts quantitatively what the user wants for the software configuration based on the provided criteria.

In at least some embodiments, the tool 130 includes an ordering module 142 that translates each set of the remaining ranked sets into a dependency tree, where the resulting plurality of dependency trees indicate the order of software installation to abide by the parameters set by the nature of the dependencies. Accordingly, the ranked compatible software packages are ordered for the optimal sequence for installation.

In some embodiments, the data storage system 108 is configured to maintain a knowledge base 190 that includes any data 192 the tool 130 needs for proper execution of the ranking and ordering of the software interrelationships. The data storage system 108 is also configured to store the data 192 collected during the various ranking and ordering operations.

Figure 2A:
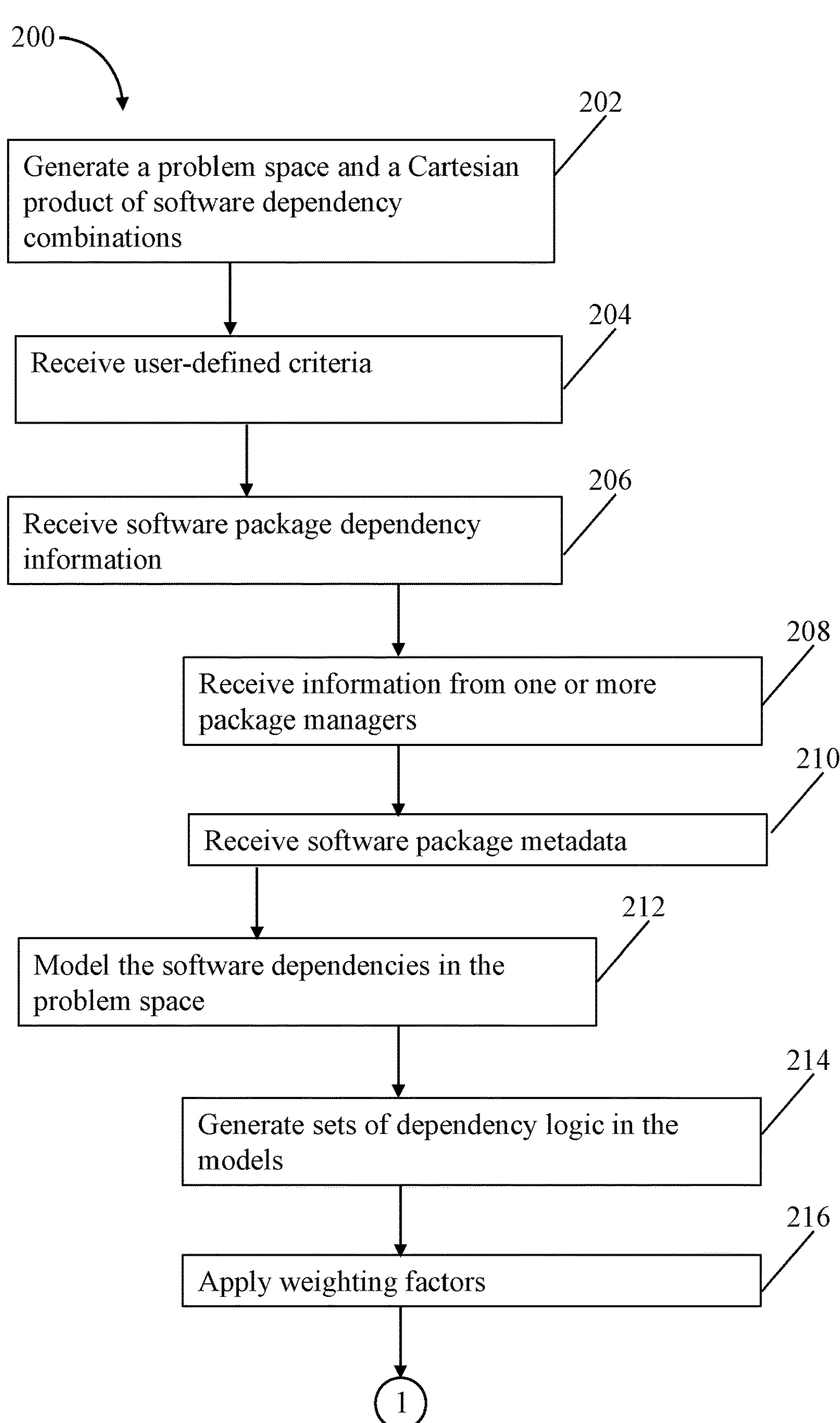
FIG. 2A is a flowchart illustrating a process for ranking and ordering software interrelationships, in accordance with some embodiments of the present disclosure.

Referring to FIG. 2A, a flowchart is presented illustrating a process 200 for ranking and ordering software interrelationships, in accordance with some embodiments of the present disclosure. In at least some embodiments, the process 200 includes generating a problem space 304 and a Cartesian product of software dependency combinations 302 (see FIG. 3). This is illustrated at step 202. Generating the Cartesian product of software dependency combinations includes inserting an Initial (first) population of software dependency combinations into the Cartesian product. Each combination of the software dependency combinations can have any number of elements representing the respective software packages starting at the numeral 2.

Figure 3:
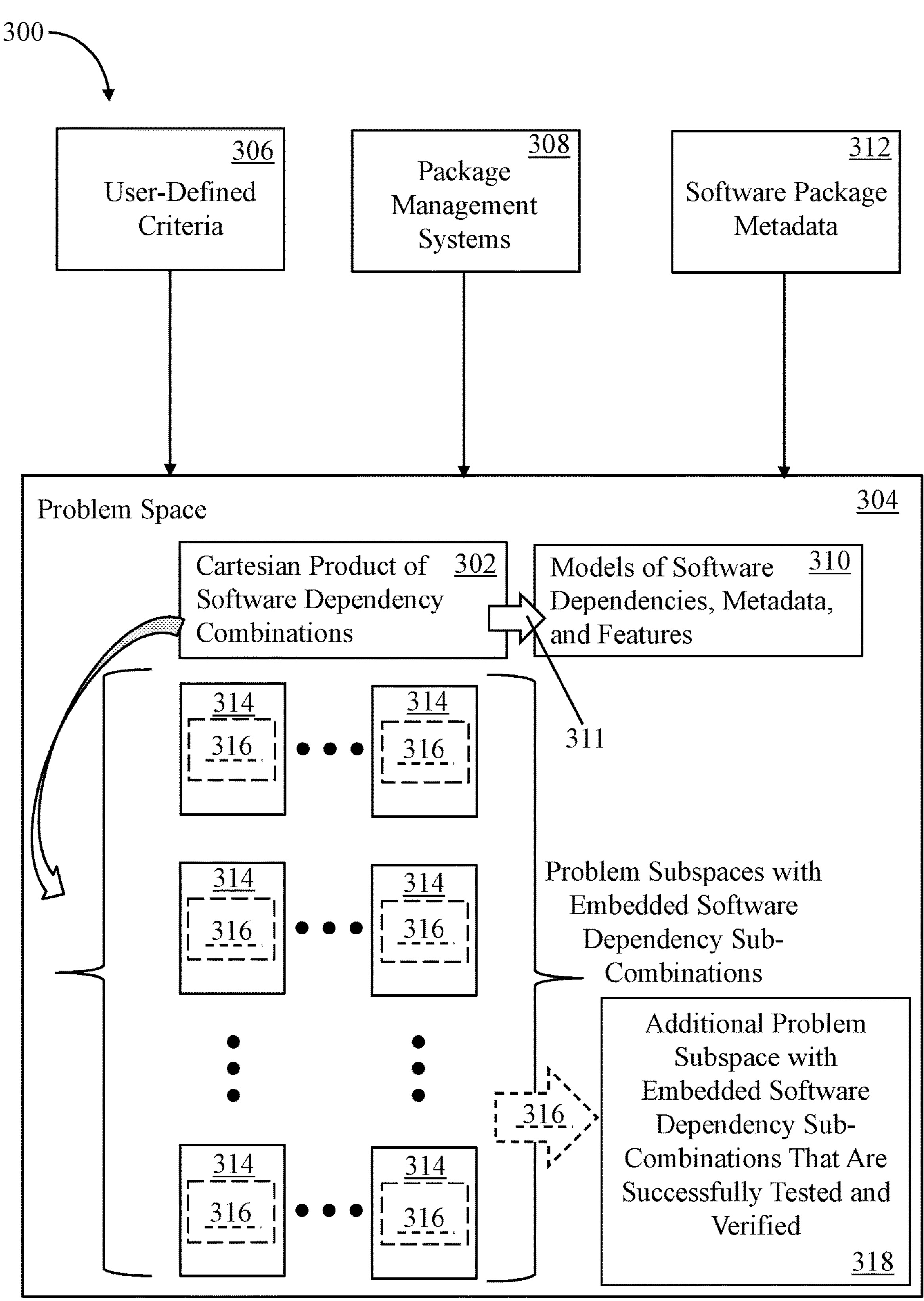
FIG. 3 is a block schematic diagram illustrating a relationship between sources of software package dependency information and a Cartesian product of software dependencies embedded within a problem space, in accordance with some embodiments of the present disclosure.

Also, referring to FIG. 3, a block schematic diagram is presented illustrating a relationship 300 between sources of software package dependency information and a Cartesian product of software dependency combinations 302 embedded within a problem space 304, in accordance with some embodiments of the present disclosure. In some embodiments, the dependency identification and modeling module 132 receives criteria, i.e., user-defined criteria 306. This is illustrated at step 204 (see FIG. 2A). Accordingly, in at least some embodiments, the Cartesian product of software dependency combinations 302 defines the problem space 304 subject to the user-defined criteria 306, where the problem space 304 will eventually include substantially all of the possible usable dependencies for the given user-defined criteria 306.

Continuing to refer to FIG. 3, in some embodiments, the user-defined criteria 306 includes predetermined criteria directed toward, for example, and without limitation, the affected software packages. In some embodiments, the user-defined criteria 306 also includes additional criteria such as, and without limitation, vulnerability counts as determined through the CVSS, and version release modification date. In some embodiments, the user-defined criteria 306 further includes criteria including one or more of, without limitation, the versions with the fewest number of defects, the fewest number of vulnerabilities, and/or the versions with the largest user base. Moreover, in some embodiments, the user-defined criteria 306 also includes additional criteria based on user-defined requirements for performance. For example, a user may determine that any version of a software package older than five years, or with a version number less than a stated version will be prohibited from installing on the respective software configurations. In addition, in some embodiments, the user-defined criteria 306 also includes specified criteria directed toward one or more of software combinations that may be more important or most commonly found in an average client environment. Moreover, in some embodiments, the user-defined criteria 306 also includes, without limitation, in addition to software-related issues, specified criteria directed toward one or more of hardware, overall environments, and software configurations. In at least some embodiments, the Cartesian product of software dependency combinations 302 defines the problem space 304 subject to the user-defined criteria 306, where the problem space 304 includes all of the possible usable dependencies for the given user-defined criteria 306.

Continuing to refer to FIG. 3, and also referring to FIGS. 1 and 3, in at least some embodiments, the dependency identification and modeling module 132 receives the software package interrelationship data, i.e., dependency data (as further described) and deposits it in the problem space 304. This is illustrated at step 206 (see FIG. 2A). In some embodiments, one source of dependency information for a large number of software packages includes various package management systems 308 such as, and without limitation, pip (the package management system authored in PYTHON®, registered to Python Software Foundation (PSF)), APT package manager, and npm package manager. Such package management systems 308 can provide version levels and package information that can be used as input into the process 200 described herein such that an optimal set of compatibility dependencies is based on the additional input data described further herein. Therefore, in some embodiments, the dependency identification and modeling module 132 receives at least a portion of the software package dependency information (see step 206) from one or more package managers. This is illustrated at step 208. In some embodiments, the dependency information for software packages is obtained from any sources that enable operation of the embodiments presented herein.

In addition, in some embodiments, for the step 206, in the event that the problem space 304 includes such a large number of software dependency combinations that any subsequent operations will be computationally expensive, the dependency identification and modeling module 132 facilitates receiving and collecting software package metadata 312 associated with the software packages from a variety of sources as described further herein. This is illustrated at step 210. At least a portion of the relevant software package metadata 312 for the software packages includes, without limitation, that metadata associated with support and service by the respective vendors that is at least partially indicative of dependency issues that have been previously identified. In addition, such software package metadata 312 includes historical and/or empirical compatibility metadata to enhance knowledge associated with known incompatibilities and existing deployments.

In some embodiments, such software package metadata 312 is collected from sources that include, without limitation, information published by the software vendors, community information for the subject software packages, known dependencies through experience, and software repositories, e.g., GITHUB® (registered to GitHub, Inc.). The respective collected software package metadata 312 facilitates determining certain software package dependencies and compatibilities, such as which versions are acceptable to use with the computing environment and software configurations, can be obtained and factored into the analyzing, weighting, and testing of software dependency compatibility. In addition, the collected software package metadata 312 will at least partially determine the stability of the respective software package within a given computing environment. Moreover, the collected software package metadata 312 will at least partially determine how compatible the respective software package is with other software packages that coexist with it in the respective software configuration.

In some embodiments, the problem space 304 is referred to as the test space, since at least a portion of the dependency compatibilities, or incompatibilities, will be tested and verified there. As such, the problem space 304, through the dependency identification and modeling module 132, transparently models the full inventory of affected software packages, the respective versions thereof, and the respective dependencies. This is illustrated at step 212. In some embodiments, certain software dependency combinations are weighed to a greater degree that other software dependency combinations. Accordingly, dependency identification and modeling module 132 generates the Cartesian product of software dependency combinations 302 that defines one or more models 310 of the dependencies, metadata, and features in the problem space 304, as indicated by an arrow 311. The subject features include, without limitation, the previously discussed functionality features (enabled or not). Accordingly, in some embodiments, the dependency identification and modeling module 132 facilitates the step 212 through analyzing the relevant software package metadata 312, including generating dependency compatibility determinations and generating sets of dependency logic. This is illustrated at step 214.

FIG. 3 also illustrates a plurality of problem subspaces 314, where each problem subspace 314 includes an embedded software dependency sub-combination 316. The problem subspaces 314 and the software dependency sub-combination 316 are discussed further with respect to step 228 (see FIG. 2B).

In addition, in at least some of the embodiments described herein, the dependency identification and modeling module 132 applies weighting factors to specific software entities in the models 310 of software dependency combinations to highlight specific combinations to further facilitate step 212. This is illustrated at step 216. The software entities include, without limitation, present and prior versions of the software packages that are subject to the present analyses. For example, and without limitation, the weighting process includes highlighting those dependency combinations that may be more important or most commonly found in client environments.

Figure 2B:
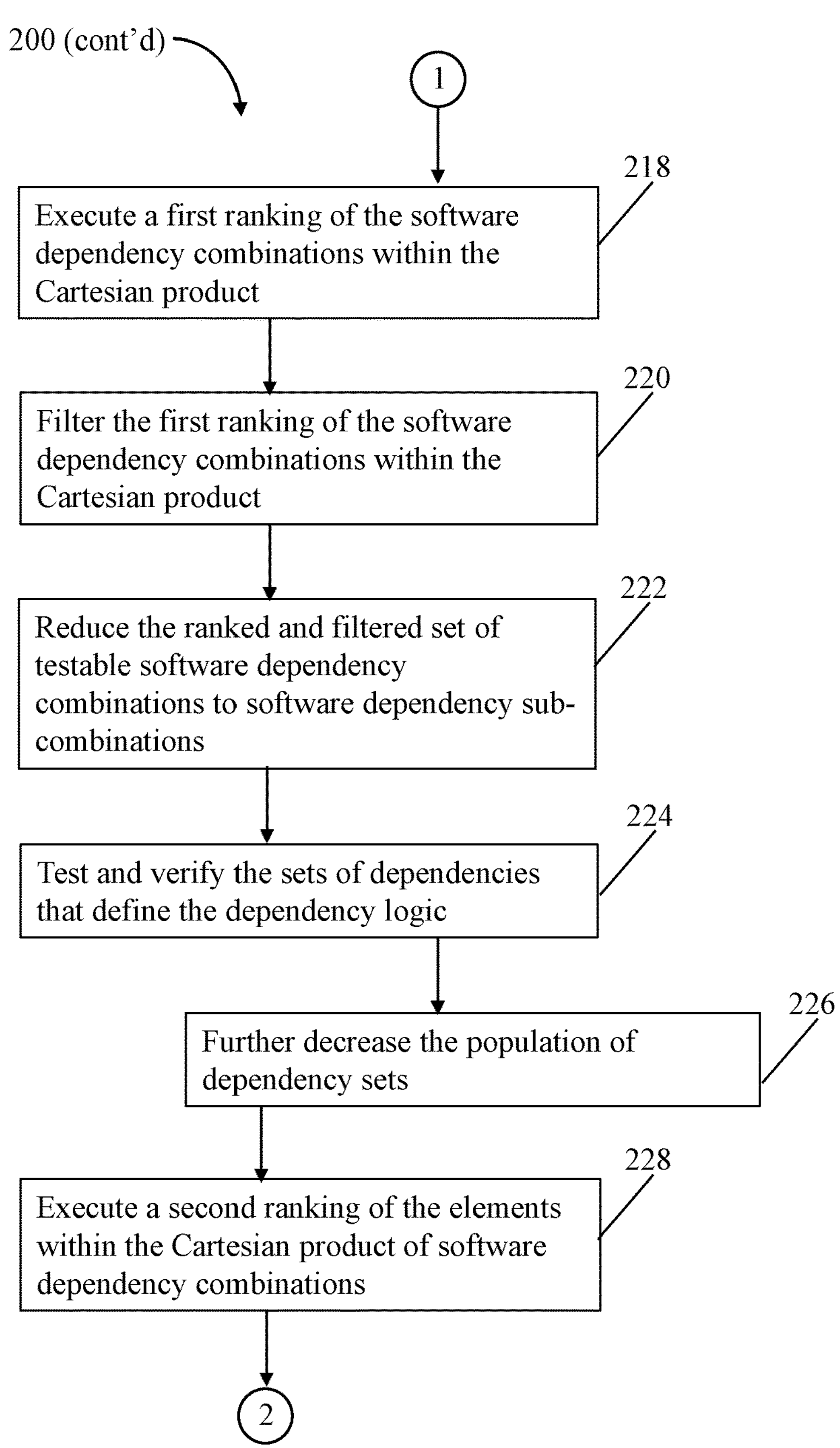
FIG. 2B is a continuation of the flowchart shown in FIG. 2A, in accordance with some embodiments of the present disclosure.

Referring to FIG. 2B, a continuation of the flowchart shown in FIG. 2A is presented, in accordance with some embodiments of the present disclosure. Continuing to refer to FIGS. 1, 2A, and 3, as previously described, in some embodiments, subject to the collected metadata and respective weightings, "average" computing environments and software configurations are modeled therefrom. In one or more embodiments, the first criteria ranking module 134 executes a first ranking of the software package dependencies within the Cartesian product of software dependency combinations. This is illustrated at step 218.

The software packages and their versions are ranked through application of the ranking criteria including one or more of, without limitation, the versions with the fewest number of defects, the fewest number of vulnerabilities, and/or the versions with the largest user base. Moreover, the ranking of the software packages and their respective dependencies and subsequent ranking of the combinations of dependencies facilitate the verification of compatibility. For example, for a present version of a software package that is version 3.5, few, if any, dependency compatibility issues are found and the applied weighting is relatively low (indicative of strong dependency compatibility) and the relative ranking will be more favorable. Similarly, for version 1.1 of the same software package, many dependency compatibilities are found and the applied weighting is relatively high (indicative of low dependency compatibility) and the relative ranking will be less favorable. Accordingly, the software package compatibilities are ranked subject to the user-defined criteria 306, and the first criteria ranking module 134 facilitates decreasing the population of software dependency combinations in the Cartesian product at least partially from that of the first population of dependencies to facilitate computing efficiency. More specifically, the generated Cartesian product of software dependency combinations 302 further generates an inventory of software package dependencies, where such inventory of software packages and their respective dependencies are ranked subject to the collected metadata 312 and the user-defined criteria 306. The remaining combinations of dependencies associated with software package dependence compatibility under consideration are testable.

In one or more embodiments, the first ranking of the sets of the software package dependencies within the Cartesian product of software dependency combinations 302 are filtered based on additional criteria through the filtering module 136. This is illustrated at step 220. Such additional criteria includes, without limitation, employment of the common vulnerability scoring system (CVSS) that is a free and open industry standard for assessing the severity of computer system security vulnerabilities. As such, CVSS assigns severity scores to vulnerabilities, thereby allowing users to prioritize responses and resources according to the detected threat. Scores range from 0 to 10, with a score of 0 indicating that the vulnerability is less significant than the highest vulnerability with a score of 10 (most severe). Therefore, in some embodiments, any software package with a CVSS less than 8 cannot be used, since it may not address the most severe vulnerabilities. In some embodiments, the additional criteria are based on user-defined requirements for performance. For example, a user may determine that any version of a software package older than five years, or with a version number less than a stated version will be prohibited from installing on the respective software configurations.

In addition, in some embodiments, rather than exclusively CVSS scores, at least a portion of the previously described metadata includes detailed security vulnerability scores for the respective dependencies. Such security-oriented metadata is provided by one or more of other institutions that generated or analyzed such metadata and collected proprietary standards. Moreover, in some embodiments, another source of security-oriented metadata includes analyses such as, without limitation, backwards compatibility, Application Programming Interface (API) compatibility, general stability, best practices, complexity scores, technical debt, and maintainability.

Accordingly, at least partially as a result of the first ranking of the first population of software dependency combinations in the Cartesian product of software dependency combinations 302 (subject to the user-defined criteria 306) (step 218), the first population of software dependency combinations in the problem space 304 is decreased through the removing of the respective software dependency combinations. In addition, at least partially as a result of the subsequent filtering of the first population of software dependency combinations in the Cartesian product of software dependency combinations 302 (also subject to the user-defined criteria 306) (step 220), the first population of software dependency combinations in the problem space 304 is decreased through the removing of the respective software dependency combinations. As such, a second population of software dependency combinations that is less than the first population of software dependency combinations is defined in the problem space 304.

After creating the ranked set of testable dependency combinations, in at least some embodiments, the population of the ranked and filtered set of testable dependency combinations is reduced through the dependency testing module 138 to software dependency sub-combinations, i.e., sets of dependencies are generated and can now be tested and verified. This is illustrated at step 222. Such reducing is at least partially subject to one or more of the user-defined criteria 306. The software dependency sub-combinations at least partially define the dependency logic. Accordingly, the software dependency sub-combinations, i.e., sets of dependencies can now be tested and verified.

In some embodiments, the dependency sets that define the dependency logic are tested and verified by the dependency testing module 138. This is illustrated at step 224. As the software dependency sub-combinations pass or fail their respective tests, the population of ranked sets of dependencies will be further decreased within the problem space 304 by flagging the results of a given software dependency set, or sub-combination, and removing it from the respective model 310 of software dependency combinations. For example, by taking the Cartesian product of a given set of dependencies remaining in the first population of software dependency combinations in the problem space 304, if a set of dependencies from the first population of software dependency combinations fail a certain condition based on the provided criterion (e.g., failure deemed by incompatibility), then all sets containing combinations of that dependency set can automatically be removed from the problem space 304.

As such, the execution of the testing and verification by the dependency testing module 138 as shown in step 224 further decreases the population of ranked and filtered sets of dependencies as the software dependency sub-combinations pass or fail their respective tests to facilitate decreasing the first population of software dependency combinations in the problem space 304 to a smaller, i.e., second population of dependency sets. This is illustrated as step 226. In some embodiments, such reduction of the dependency sets is executed through creating problem subspaces, where at least a portion of the problem subspaces are limited to the respective sets of dependencies. As such, the population in the problem space 304 is further reduced to one or more problem subspaces 314 (see FIG. 3) based on the additional user-defined criteria. As a result, the overall set of possible options to be evaluated is at least partially based on the set of options applicable to the target environment. Within this reduction, the testable ordered sets (shown as the software dependency sub-combinations 316 in FIG. 3) are generated, where these sets of software dependency sub-combinations 316 are then tested, and those successful software dependency sub-combinations 316 are then stored into a further reduced subspace. More specifically, those embedded software dependency sub-combinations 316 that are successfully tested and verified are embedded within an additional problem subspace 318. Accordingly, the dependency testing module 138 executes the testing and verification of the dependency sets of the software dependency sub-combinations 316 through a second round of reductions of the combinations to be further evaluated resulting in a problem subspace 318 that has fewer software dependency sub-combinations 316 than the first population in the problem space 304.

Therefore, in at least some embodiments, the dependency logic in the form of testable software dependency sub-combinations, i.e., the sets of dependencies that were generated, ranked, filtered, and tested/verified as previously described are remaining resident within the respective subspaces. In one or more embodiments, a second ranking of the remaining software dependency sub-combinations is executed by the second criteria ranking module 140. This is illustrated as step 228. In some embodiments, the second ranking of the remaining software dependency combinations is executed through the translation of each respective software dependency sub-combination into an eigenvector. In some embodiments, such ranking includes further testing subject to additional criteria such as, and without limitation, vulnerability counts as determined through the CVSS, and version release modification date. Once the sets of dependencies are tested subject to the ranking, if the set fails, the set is labeled as incompatible dependencies, thereby designating the respective software packages as incompatible, and the respective subspace population of sets of dependencies is further decreased. If the set passes the testing, the respective dependencies are compatible. Once the testing of each set of dependencies is completed, the final ranking of the sets of dependencies is used to create a respective eigenvector set of compatibility amongst dependencies that may be collapsed into an eigenvalue that ultimately depicts quantitatively the software configuration based on the provided criteria. For example, in some embodiments, since the eigenvector (or the set of eigenvectors) defines the attributes used for the subsequent ordering, it is sufficient for the remaining steps of the process 200. In contrast, in some embodiments, since the eigenvalues define a representation of the overall eigenvector(s), the respective eigenvalue provides greater value to the process 200 than the eigenvector. Accordingly, the step 228 includes generating a ranking of software dependency combinations through employing respective eigenvectors. The ranking is at least partially subject to the one or more user-defined criteria 306.

While at least some of the embodiments described herein use eigenvectors and eigenvalues to execute the second ranking per step 228, any mechanism that ranks and prepares the remaining software dependency sub-combinations for the subsequent ordering of the installation of the software packages that enables operation of the system 100 as described herein is used. For example, and without limitation, one or more iterations of the first ranking step 218 with ranking criteria not previously employed in step 218 are executed until a predetermined ranking requirement is met.

Figure 2C:
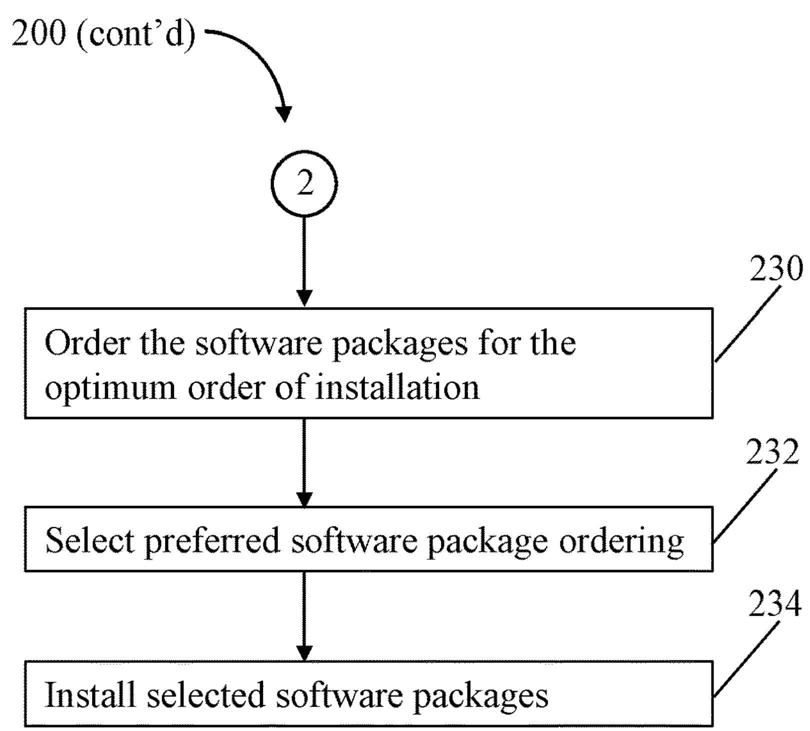
FIG. 2C is a continuation of the flowchart shown in FIG. 2B, in accordance with some embodiments of the present disclosure.

Referring to FIG. 2C, a continuation of the flowchart shown in FIG. 2B is presented, in accordance with some embodiments of the present disclosure. Continuing to refer to FIGS. 1, 2A, 2B, and 3, in at least some embodiments, each set of the remaining ranked sets is translated into a dependency tree by the ordering module 142, where the resulting plurality of dependency trees indicate the optimum order of software installation to abide by the parameters set by the nature of the dependencies. This is illustrated by step 230. In some embodiments, the different dependency trees for each version of compatible software are compared, and if more than one version is compatible and could be installed, each version of the subject software will have an eigenvector for all of the dependencies for that version.

Once the eigenvectors for each of the compatible versions are generated, the user-defined criteria 306 is used to determine which of the versions will be installed first, and if acceptable to the user, will be utilized as a portion of the software configuration. Accordingly, step 230 includes ordering the ranked software dependency combinations through the respective eigenvectors such that the ranked compatible software packages are ordered for the optimal sequence for installation.

Therefore, the user will select the preferred software package ordering. This is illustrated by step 232. Accordingly, the user will install the selected software packages. This is illustrated by step 234.

An example of the concepts described with respect to FIGS. 2A, 2B, and 2C includes considering three software packages, i.e., package 1, package 2, and package 3. The three packages and their respective versions are:

Package 1 includes versions {1.3, 1.2, 1.1, and 1.0} in order of increasing age of the versions.

Package 2 includes versions {2.5, 2.4, 2.3, 2.2, 2.1}.

Package 3 includes versions {3.1, 3.0, 2.9}.

Also referring to FIGS. 1 and 3, the user-defined criteria 306 are received per step 204 and is used to populate the problem space 304 with the Cartesian product of software dependency combinations 302 per step 202 subject to the user-defined criteria 306. The respective software package dependency information is received from the one or more package management systems 308 and the software package metadata 312 is also received (if necessary) per steps 206, 208, and 210. The respective software dependency combinations are modeled per step 212 through the models 310 of software dependency combinations generate sets of dependency logic in the models per step 214. In accordance with step 216, weighting factors are used to begin leveraging the user-defined criteria 306 to set the software dependency combinations up for subsequent ranking. In some embodiments, heavier weighting factors are applied to bias the respective software dependency combinations more disfavorably than those software dependency combinations with lighter weighting factors. For example, in some embodiments, the lighter weighting factors are applied to those versions of software packages that are the most recent released versions with the least vulnerabilities and are most compatible with the given input of dependencies. Referring again to the three example packages, the weighting factors are applied to the respective software versions pert step 216 and the first ranking of the software packages is executed per step 218 to generate the following parenthesized rankings:

Package 1: {1.3 (0), 1.2 (1), 1.1 (2), 1.0 (3)}.

Package 2: {2.5 (0), 2.4 (1), 2.3 (2), 2.2 (3), 2.1 (4)}.

Package 3: {3.1 (0), 3.0 (1), 2.9 (2)}.

In the present example, the ranked versions of the software packages are filtered per step 220 to remove the versions of the software packages with the lowest ranking to reduce the number of software dependency combinations per step 222 to provide the following software dependency sub-combinations:

Package 1: {1.3 (0), 1.2 (1), 1.1 (2)}.

Package 2: {2.5 (0), 2.4 (1), 2.3 (2)}.

Package 3: {3.1 (0), 3.0 (1), 2.9 (2)}.

The resulting software dependency sub-combinations are tested and verified per step 224 to further decrease the population of dependency sets per step 226, where in the present example, no additional versions are eliminated. The second ranking of the software dependency combinations per step 228 results in the optimum order of installation for the software packages for the per step 230. As such, the ordering of the software dependency sub-combinations is created such that:

{(x, y, z)}→{(Package 1, Package 2, Package 3)}, resulting in

{(1.3, 2.5, 3.1) (0), (1.2, 2.4, 3.0) (1), (1.1, 2.3, 2.9) (2)}.

Accordingly, the above result is a set of compatibility interrelationships between the given dependencies for the respective software packages based on given user-defined criteria 306.

The embodiments as disclosed and described herein are configured to provide an improvement to the technological field associated with software configuration management through enhanced, automated ranking and ordering of software interrelationships. The embodiments presented herein eliminate known issues with the current landscape. Specifically, an optimized rankable and orderable set of compatible software packages (based on specified criteria) is generated for software and hardware environments and/or configurations. One advantage of the embodiments presented herein result in automatically un-wrangling dependency issues of densely intertwined software packages, thereby eliminating unnecessary manual research and the associated costs. In addition, any potential exploitable vulnerabilities that are associated with the dependencies can be avoided. Moreover, all dependencies including version compatibilities are identified at all levels of the computing environment including hardware dependencies and operating system dependencies subject to the criteria employed. In addition, porting software to other environments no longer requires manually analyzing layers of composition.

Therefore, for a given set of user-defined criteria, an actual ranking and ordering of applicable dependencies and their associated software versions is generated, such that these packages (or dependencies) can be properly installed. As such, an optimally ranked and ordered set of combability and dependency interrelationships based on one or more specified criteria for software packages, related hardware, computing environments, and/or software configurations is generated.

As such, the embodiments described herein integrate the ranking and ordering of software interrelationships into a practical application that improves the functioning of the computing systems and technologies associated with software configuration management. Moreover, with the automatic elimination of incompatible software configurations, the respective computing systems scheduled to receive the respective software loading will not suffer issues associated with incompatible interdependencies. Accordingly, the embodiments described herein facilitate the aforementioned integration into a practical application of a computer system, computer readable storage medium, and computer-implemented method for enhancing software configuration management.

Moreover, the benefits attained through enhanced management of software dependency-based interrelationships as presented herein may be extrapolated to other software interrelationships, such as, and without limitation, software qualities (sometimes referred to as attributes and characteristics) interrelationships, software non-functional features interrelationships, and software functional requirements interrelationships. Accordingly, the embodiments described herein will further enhance the practical application that improves the functioning of the computing systems and technologies associated with software configuration management.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
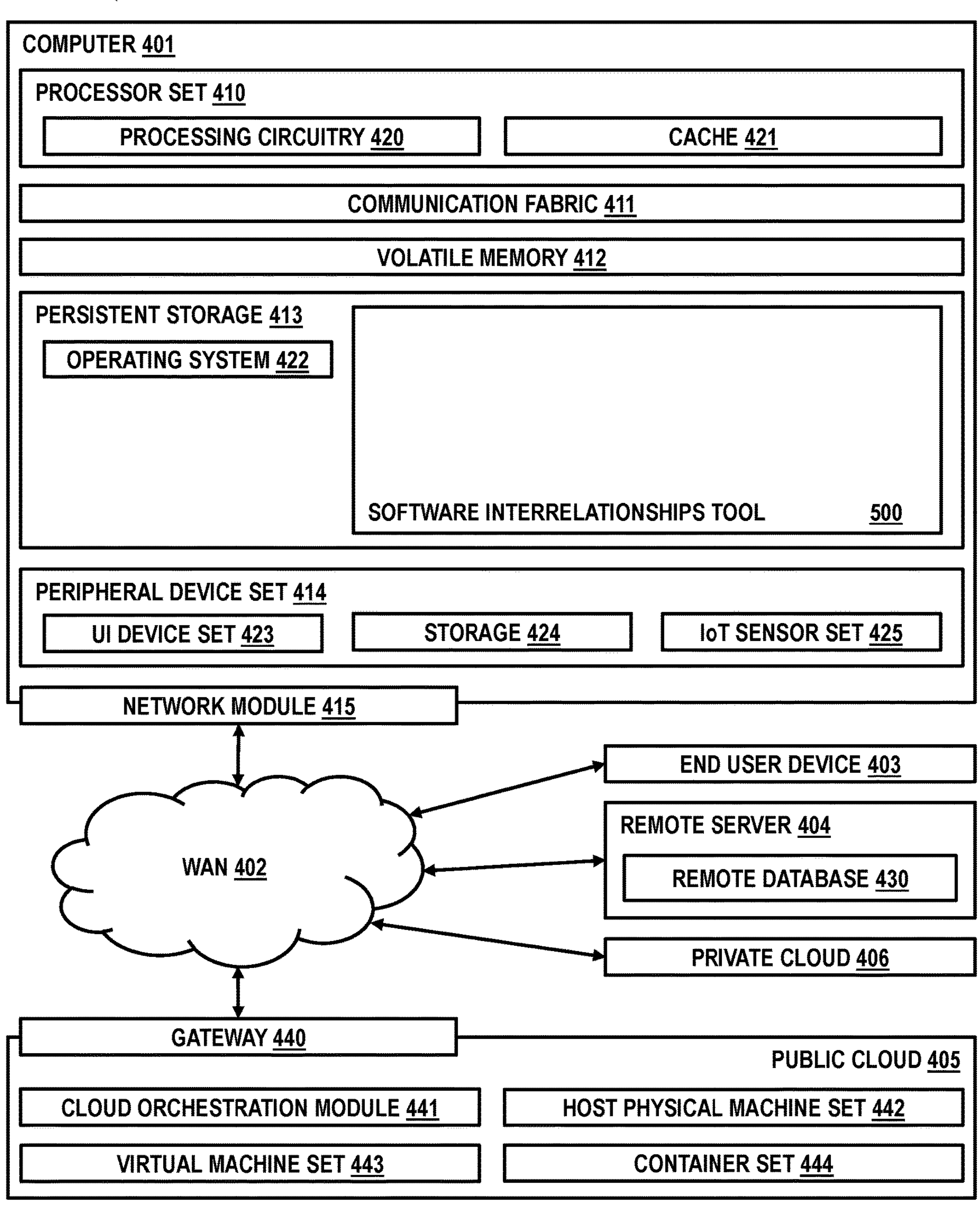
FIG. 4 is as block schematic diagram illustrating an example of a computing environment for the execution of at least some of the computer code involved in performing the disclosed methods described herein, in accordance with some embodiments of the present disclosure.

Referring to FIG. 4, a block schematic diagram is presented illustrating an example of a computing environment for the execution of at least some of the computer code involved in performing the disclosed methods described herein, in accordance with some embodiments of the present disclosure.

Computing environment 400 contains an example of an environment for the execution of at least some of the computer code involved in performing the disclosed methods, such as the software interrelationships tool 500 (shown as 130 in FIG. 1). In addition to block 500, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 500, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 421 and the other storage media discussed below. The program instructions, and associated data, are accessed by processor set 410 to control and direct performance of the disclosed methods. In computing environment 400, at least some of the instructions for performing the disclosed methods may be stored in block 500 in persistent storage 413.

Communication fabric 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 500 typically includes at least some of the computer code involved in performing the disclosed methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the disclosed methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for ranking and ordering software interrelationships, comprising:

one or more processing devices;

one or more memory devices communicatively and operably coupled to the one or more processing devices;

a software interrelationships tool at least partially resident within the one or more memory devices, the software interrelationships tool configured to:

generate a ranking of software dependency combinations, wherein the ranking is at least partially subject to one or more criteria, the software dependency combinations associated with inherent dependences between software and an operating system; and order the ranked software dependency combinations, ordering the ranked software dependence combinations being directed towards a temporal order of installing software packages.

2. The system of claim 1, wherein the software interrelationships tool is further configured to:

insert a first population of software dependency combinations into a Cartesian product, thereby generating a Cartesian product of software dependency combinations;

remove, subject to the one or more criteria, one or more software dependency combinations from the Cartesian product of software dependency combinations, thereby defining a second population of software dependency combinations that is less than the first population of software dependency combinations;

reduce, subject to the one or more criteria, each software dependency combination of the second population of software dependency combinations into one or more software dependency sub-combinations; and translate each software dependency sub-combination into an eigenvector.

3. The system of claim 2, wherein the software interrelationships tool is further configured to:

reduce, subject to the one or more criteria, each software dependency combination of the second population of software dependency combinations into one or more sets of dependencies.

4. The system of claim 1, wherein the software interrelationships tool is further configured to:

receive software package interrelationship data comprising one or more of:

receive software package dependency information;

receive information from one or more package managers; and receive software package metadata from one or more repositories.

5. The system of claim 1, wherein each software dependency combination includes two or more software dependencies, the software interrelationships tool is further configured to:

model the two or more software dependencies, comprising one or more of:

generate sets of dependency logic within one or more models; and apply weighting factors to one or more software entities resident within the one or more models.

6. The system of claim 2, wherein the software interrelationships tool is further configured to:

generate a first ranking of the software dependency combinations within the Cartesian product of software dependency combinations;

generate a filtered first ranking of the software dependency combinations within the Cartesian product of software dependency combinations; and reduce, subject to the one or more criteria, the filtered first ranking of the software dependency combinations to software dependency sub-combinations.

7. The system of claim 6, wherein each software dependency combination includes one or more sets of software dependencies, the software interrelationships tool is further configured to:

test and verify the one or more sets of the software dependencies; and decrease a population of the one or more sets of the software dependencies and decrease the first population of the software dependency combinations.

8. The method of claim 1, wherein one or more criteria associate with the ranking include one or more versions with a fewest number of defects, one or more versions with a fewest number of vulnerabilities, and one or more versions with a largest user base.

9. A computer readable storage medium having computer executable instructions that when executed by at least one computing device ranks and orders software interrelationships, comprising instructions to:

generate a ranking of software dependency combinations, wherein the ranking is at least partially subject to one or more criteria, the software dependency combinations associated with inherent dependences between software and an operating system; and order the ranked software dependency combinations, ordering the ranked software dependence combinations being directed towards a temporal order of installing software packages.

10. The computer readable storage medium of claim 9, further comprising instructions to:

insert a first population of software dependency combinations into a Cartesian product, thereby generating a Cartesian product of software dependency combinations;

remove, subject to the one or more criteria, one or more software dependency combinations from the Cartesian product of software dependency combinations, thereby defining a second population of software dependency combinations that is less than the first population of software dependency combinations;

reduce, subject to the one or more criteria, each software dependency combination of the second population of software dependency combinations into one or more software dependency sub-combinations; and translate each software dependency sub-combination into an eigenvector.

11. The computer readable storage medium of claim 10, further comprising instructions to:

reduce, subject to the one or more criteria, each software dependency combination of the second population of software dependency combinations into one or more sets of dependencies.

12. The computer readable storage medium of claim 9, further comprising instructions to:

receive software package interrelationship data comprising one or more of:

receive software package dependency information;

receive information from one or more package managers; and receive software package metadata from one or more repositories.

13. The computer readable storage medium of claim 9, further comprising instructions to:

model two or more software dependencies, wherein each software dependency combination includes the two or more software dependencies, comprising one or more of:

generate sets of dependency logic within one or more models; and apply weighting factors to one or more software entities resident within the one or more models.

14. The computer readable storage medium of claim 10, further comprising instructions to:

generate a first ranking of the software dependency combinations within the Cartesian product of software dependency combinations;

generate a filtered first ranking of the software dependency combinations within the Cartesian product of software dependency combinations;

reduce, subject to the one or more criteria, the filtered first ranking of the software dependency combinations to software dependency sub-combinations;

test and verify one or more sets of the software dependencies, wherein each software dependency combination includes the one or more sets of software dependencies; and decrease a population of the one or more sets of the software dependencies and decrease the first population of software dependency combinations.

15. A computer-implemented method for ranking and ordering software interrelationships, comprising:

generating a ranking of software dependency combinations, wherein the ranking is at least partially subject to one or more criteria, the software dependency combinations associated with inherent dependences between software and an operating system; and ordering the ranked software dependency combinations, ordering the ranked software dependence combinations being directed towards a temporal order of installing software packages.

16. The method of claim 15, further comprising:

inserting a first population of software dependency combinations into a Cartesian product, thereby generating a Cartesian product of software dependency combinations;

removing, subject to the one or more criteria, one or more software dependency combinations from the Cartesian product of software dependency combinations, thereby defining a second population of software dependency combinations that is less than the first population of software dependency combinations;

reducing, subject to the one or more criteria, each software dependency combination of the second population of software dependency combinations into one or more software dependency sub-combinations; and translating each software dependency sub-combination into an eigenvector.

17. The method of claim 16, wherein the reducing each software dependency combination of the second population of software dependency combinations comprising:

reducing, subject to the one or more criteria, each software dependency combination of the second population of software dependency combinations into one or more sets of dependencies.

18. The method of claim 15, further comprising:

receiving software package interrelationship data comprising one or more of:

receiving software package dependency information;

receiving information from one or more package managers; and receiving software package metadata from one or more repositories.

19. The method of claim 15, wherein each software dependency combination includes two or more software dependencies, further comprising:

modeling the two or more software dependencies, comprising one or more of:

generating sets of dependency logic within one or more models; and applying weighting factors to one or more software entities resident within the one or more models.

20. The method of claim 16, wherein the generating a ranking of software dependency combinations comprises:

generating a first ranking of the software dependency combinations within the Cartesian product of software dependency combinations;

generating a filtered first ranking of the software dependency combinations within the Cartesian product of software dependency combinations; and reducing, subject to the one or more criteria, the filtered first ranking of the software dependency combinations to software dependency sub-combinations.

21. The method of claim 20, wherein each software dependency combination includes one or more sets of software dependencies, further comprising:

testing and verifying the one or more sets of the software dependencies; and decreasing a population of the one or more sets of the software dependencies and decreasing the first population of the software dependency combinations.

* * * * *